United States Patent
Pignato (10) Patent No.: US 6,240,346 B1
(45) Date of Patent: May 29, 2001

(54) SYSTEM WITH LIGHT DISPLAY AND DATA RECORDER FOR MONITORING VEHICLE IN RELATION TO ADJACENT VEHICLE

(76) Inventor: Gary D. Pignato, 117 W. Brantwood Ave., Elk Grove, IL (US) 60007

( * ) Notice: Subject to any disclaimer, the term of this patent is extended or adjusted under 35 U.S.C. 154(b) by 0 days.

(21) Appl. No.: 09/401,441

(22) Filed: Sep. 22, 1999

Related U.S. Application Data (60) Provisional application No. 60/102,313, filed on Sep. 29, 1998.

(51) Int. Cl.[7] .............................. G06F 7/00; G06F 17/00
(52) U.S. Cl. ............................. 701/35; 701/301; 701/1; 701/96; 340/901; 340/463
(58) Field of Search ................... 701/35, 1, 301, 701/96, 93, 23; 340/901, 902, 903, 425.5, 438, 463, 825.06; 342/455; 307/9.1; 280/422

(56) References Cited

U.S. PATENT DOCUMENTS

| | | | |
|---|---|---|---|
| 4,621,705 | * 11/1986 | Etoh | 180/169 |
| 5,161,632 | * 11/1992 | Asayama | 340/435 |
| 5,189,619 | * 2/1993 | Adachi et al. | 701/96 |
| 5,239,470 | * 8/1993 | Komatsu | 701/35 |
| 5,420,792 | * 5/1995 | Butsuen et al. | 701/96 |
| 5,502,432 | * 3/1996 | Ohmamyuda et al. | 340/436 |
| 5,594,414 | * 1/1997 | Namngani | 340/436 |
| 5,675,518 | * 10/1997 | Kuroda et al. | 701/96 |
| 5,771,007 | * 6/1998 | Arai et al. | 340/903 |
| 5,901,806 | * 5/1999 | Takahashi | 180/170 |
| 5,934,399 | * 8/1999 | Iiboshi et al. | 180/169 |
| 5,957,983 | * 9/1999 | Tominaga | 701/23 |
| 6,009,368 | * 12/1999 | Labuhn et al. | 701/96 |
| 6,114,951 | * 9/2000 | Kinoshita et al. | 340/436 |
| 6,121,896 | * 9/2000 | Rahman | 340/902 |
| 6,154,168 | * 11/2000 | Egawa et al. | 342/71 |
| 6,161,073 | * 12/2000 | Tange et al. | 701/96 |

* cited by examiner

Primary Examiner—William A. Cuchlinski, Jr.
Assistant Examiner—Olga Hernandez
(74) Attorney, Agent, or Firm—McAndrews, Held & Malloy, Ltd.

(57) ABSTRACT

A system installed in a resident vehicle monitors a number of operating profile parameters of the resident vehicle as well as data associated with the resident vehicle in relation to a leading or trailing vehicle. A light indicator having a number of lights viewable by a trailing vehicle and/or the driver of the resident vehicle is controlled to provide a warning to indicate that one of the vehicles is tailgating another vehicle and/or closing on another vehicle at a speed that is unsafe. The monitored data is stored in association with the time of occurrence of the data to provide a record thereof. Further, the system can include one or more cameras to provide a digital image of the view in front of the resident vehicle or in back thereof. The images are stored in association with the profile and time of occurrence data to provide a record thereof.

45 Claims, 8 Drawing Sheets

TADDLE LIGHT PATTERN KEY

FIG. 10A
MODE 0
ALL OFF

FIG. 11B
MODE 1B
ALTERNATING BOTH LEFT TO RIGHT

FIG. 12A
MODE 2
LOWER ON

FIG. 10B
MODE 1
ALL ON

FIG. 12B
MODE 2A
LOWER TOGETHER INTERMITANT

FIG. 11A
MODE 1A
ALTERNATING BOTH LOWER TO BOTH UPPER

FIG. 11C
MODE 1C
ALTERNATING DIAGONAL LEFT TO RIGHT

FIG. 12C
MODE 2B

LOWER ALTERNATELY INTERMITANT

FIG. 13A
MODE 3

UPPER ON

FIG. 13B
MODE 3A

UPPER TOGETHER INTERMITANT

FIG. 13C
MODE 3B

UPPER ALTERNATELY INTERMITANT

SYSTEM WITH LIGHT DISPLAY AND DATA RECORDER FOR MONITORING VEHICLE IN RELATION TO ADJACENT VEHICLE

CROSS-REFERENCE TO RELATED APPLICATIONS

This application claims the priority of provisional application Ser. No. 60/102,313 filed Sep. 29, 1998. That application is hereby incorporated herein by reference.

STATEMENT REGARDING FEDERALLY SPONSORED RESEARCH OR DEVELOPMENT

N/A

TECHNICAL FIELD

The present invention is directed to a system for monitoring a vehicle in relation to an adjacent vehicle i.e. a leading or trailing vehicle and more particularly to such a system that provides a warning of unsafe driving behavior and/or a record of the vehicle's operation in relation to a leading and/or trailing vehicle.

BACKGROUND OF THE INVENTION

Flight data recorders for use in aircraft are known for recording various operating parameters of the aircraft over time so as to provide a historical flight profile record. An analysis of the flight profile record can uncover deviations from normal flight profiles and have been extremely useful in analyzing the causes of numerous aircraft accidents.

These flight data recorders have not been used in ground vehicles for similar purposes because the operating parameters of one ground vehicle are in general, alone, not indicative of the cause of an accident between two vehicles.

BRIEF SUMMARY OF THE INVENTION

In accordance with the present invention, the disadvantages of prior data recorders have been overcome to provide a monitoring and data recording system suitable for use in a ground vehicle. The system of the present invention monitors the vehicle in which the system is installed, referred to as the resident vehicle, in relation to an adjacent vehicle that is leading or trailing the resident vehicle to provide a warning of unsafe driving behavior and/or to provide a record of the circumstances in which the resident vehicle has been operated.

More particularly, the system, in one embodiment, includes a range finder mounted on the resident vehicle to determine a distance from an adjacent vehicle that is trailing or leading the resident vehicle. A controller is responsive to the speed of the resident vehicle to determine a safe following distance wherein the controller compares the adjacent vehicle distance to the safe following distance to determine whether the adjacent vehicle distance is less than the determined safe following distance. An indicator is mounted on the resident vehicle and is preferably viewable by a trailing vehicle so as to provide a warning that either the trailing vehicle is following the resident vehicle too closely or that the resident vehicle is following the leading vehicle too closely. In addition thereto, or alternatively, an indicator may be positioned so as to be viewable by the driver of the resident vehicle.

In accordance with another feature of the present invention, the controller samples the adjacent vehicle distance over time so as to determine how fast one vehicle is approaching the adjacent vehicle. If one vehicle is approaching an adjacent vehicle too fast, the controller controls the indicator to provide a warning indication thereof. In a preferred embodiment, the indicator includes a number of lights that are controlled to provide a number of different light patterns each of which represents a different warning or message.

Further, the system of the present invention includes a memory for storing data. The controller stores in the memory data representing a number of operating parameters of the resident vehicle sampled over a period of time and data representing the distance of an adjacent vehicle in association with data representing the time of occurrence of the stored data so as to provide a record thereof.

In accordance with another feature of the present invention, the system includes at least one camera mounted on the resident vehicle in a position to pick up an image of a trailing or leading vehicle. The controller stores in the memory a series of images picked up by the camera over a period of time and in association with data representing the time of occurrence of the respective images so as to provide a record thereof.

The historical record provided by the stored images and vehicle operation parameter data enables the circumstances surrounding an accident to be analyzed so the cause of the accident can be ascertained. The historical record also provides a substantial deterrent to tail-gating, lane weaving, speeding, etc. so as to promote a safer ground transportation environment.

These and other advantages and novel features of the present invention, as well as details of an illustrated embodiment thereof, will be more fully understood from the following description and drawings.

DETAILED DESCRIPTION OF THE INVENTION

Figure 1:
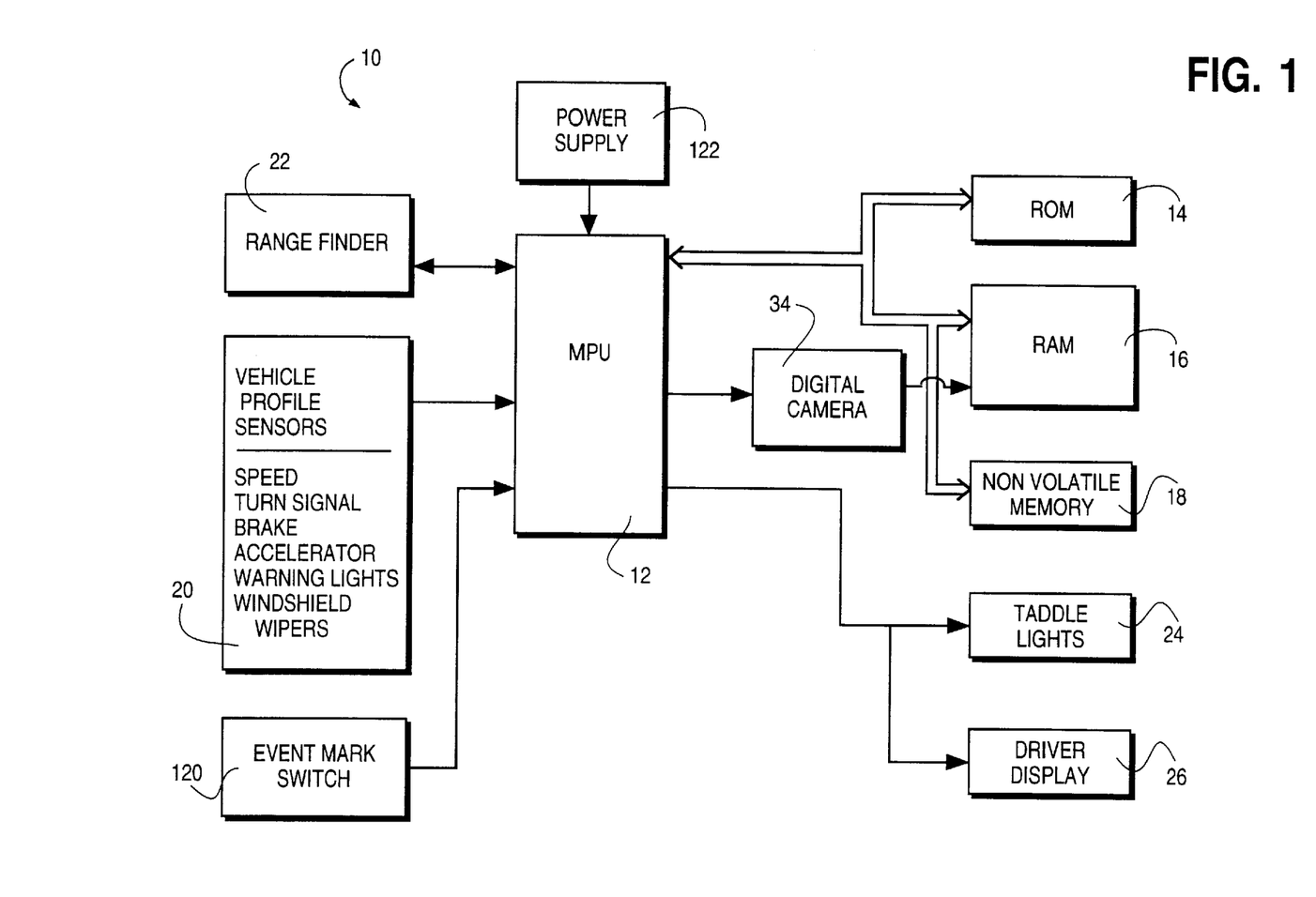
FIG. 1 is a block diagram illustrating the vehicle monitoring and data recording system of the present invention.

The vehicle monitoring and recording system 10 of the present invention as shown in FIG. 1, is installed on a resident vehicle to provide warnings of unsafe driving behavior of a resident vehicle driver and/or a trailing vehicle driver. The system 10 monitors the operation of the resident vehicle in relation to a trailing and/or leading vehicle and further records images picked up by the resident vehicle showing the behavior of a trailing and/or a leading vehicle to provide a record thereof.

The system 10 includes a controller that is formed of a microprocessor 12 operating in accordance with software stored in a memory, such as a read only memory or ROM 14. The controller monitors and records a number of vehicle operating parameters, adjacent vehicle distance data and image data in a memory which may take the form of a random access memory, RAM 16 and/or non-volatile memory 18 to provide a historical record of the resident vehicle's operation in relation to the operation of a trailing or leading vehicle and/or surrounding circumstances as discussed in detail below. The operating profile parameters of the resident vehicle are picked up by a number of sensors or pick up devices 20 coupled to the microprocessor 12. The operating profile parameters include the speed of the resident vehicle, and data representing the actuation of the right and left turn signals, the brake, the accelerator, the warning lights and the windshield wipers of the resident vehicle. The microprocessor 12 repetitively samples these data parameters over time to provide a historical record of the data.

A range finder 22 is coupled to the microprocessor 12 to provide data representing the distance to an adjacent vehicle that is leading or trailing the resident vehicle. The range finder 22 can take any form of well-known devices for measuring distance. One such known device is the IMPULSE range finder from Laser Technology, Inc. that is controlled to periodically measure the distance to an adjacent object within its range. The range finder 22 is mounted on the resident vehicle in a position so that when actuated, the range finder 22 can determine the distance to a trailing vehicle within its range. Alternatively, or in addition thereto, a second range finder can be mounted on the resident vehicle in a position so that when actuated, the range finder can determine the distance to a leading vehicle within its range.

In response to the detected distance of an adjacent vehicle, trailing and/or leading the resident vehicle, the microprocessor 12 determines whether one or two of the vehicles is following or being followed too closely. More particularly, the microprocessor 12 determines a safe following distance based on the speed of the resident vehicle as discussed in detail below. The microprocessor 12 compares the adjacent vehicle distance to the calculated safe following distance to determine whether the adjacent vehicle distance is less than the safe following distance. The microprocessor 12 also determines a vehicle closing velocity, i.e. the speed at which one vehicle is closing on an adjacent vehicle based on a number of adjacent vehicle distance values sampled over a period of time. Depending on how fast one vehicle is closing on an adjacent vehicle and/or depending on how the adjacent vehicle distance compares to the safe following distance, the controller controls one or more indicators 24 and 26 to provide a message or warning indicative of the current relation between the vehicles.

Figure 2:
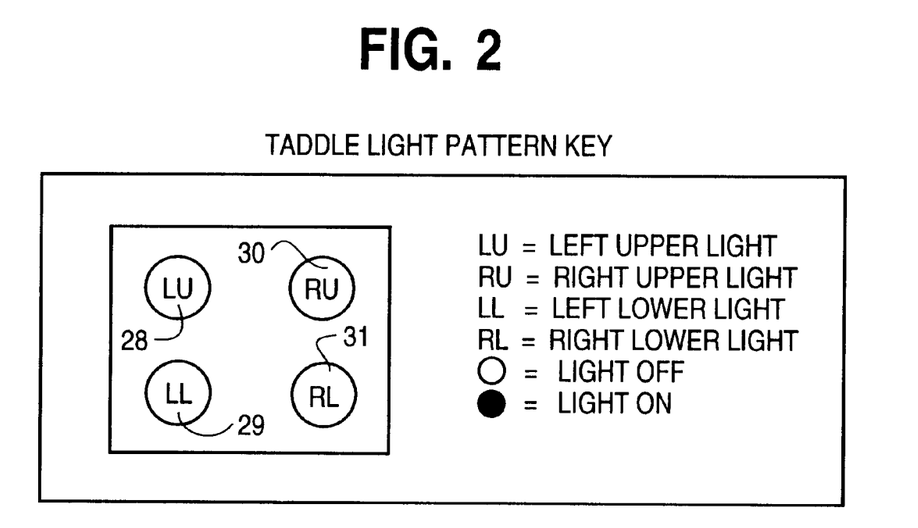
FIG. 2 is a block diagram illustrating the indicator lights of the present invention.

In a preferred embodiment, the indication is provided by a number of lights 24 that are mounted on the resident vehicle so as to be viewable by the trailing vehicle. These lights are referred to as Tail-gate Alert Distance Determining Light Equipment or TADDLE. The TADDLE lights provide various light presentations to the rear of the resident vehicle in addition to the existing vehicle taillights. The augmented light presentation of the TADDLE lights provides various messages or warnings to the trailing vehicle. A similar light presentation may be provided by a light display 26 mounted in the resident vehicle so as to be viewable by the driver thereof. As an example, the TADDLE lights 24 can include four lights 28–31 mounted respectively at or adjacent to the left upper corner of the resident vehicle's rear window, the left lower corner thereof, the right upper corner thereof and the right lower corner thereof. The controller controls the four lights 28–31 to provide various light patterns that are viewable by the trailing vehicle driver and/or the resident vehicle driver so as to warn the driver that he is tailgating and/or closing on the vehicle in front of him too fast. Because the driver of a trailing vehicle often cannot see around a resident vehicle to view the relationship between the resident vehicle and a leading vehicle, the TADDLE lights 24 are controlled to advise the trailing vehicle driver whether the resident vehicle is tail-gating or closing on the leading vehicle too fast. This feature is useful in preventing pile-up accidents.

The adjacent vehicle distance data is stored in the memory 16 and/or 18 with the vehicle parameter data from the vehicle profile sensors 20 and with data representing the time of occurrence of the sampled distance and profile data so as to provide a historical record thereof that can be used to analyze the surrounding circumstances of, for example, an accident. In one embodiment of the present invention, the data is stored in a portion of the RAM 16 that stores a predetermined amount of the data. As more data is collected, the controller 12 replaces the oldest data with the newest data in the memory 16. Upon the occurrence of one of a number of events, the microprocessor 12 transfers the historic data stored in the RAM 16 to a non-volatile memory 18 so that it can be preserved through an accident. It is noted, that the functions performed by the two separate memories 16 and 18 can be combined into a single memory as will be apparent to one of ordinary skill in the art. If a single memory is used, upon the occurrence of one of a number of events, the microprocessor 12 will not write over the data in the memory so that a permanent record thereof will be maintained. A permanent record memory as used herein refers to a data storage device that can withstand an accident so that the data stored therein can be analyzed. It is further noted that memories other than a ROM or RAM, such as an EPROM, EEPROM, disk, solid state recorder, Data Acquisition Tape recorder, etc. can be employed as well.

In another embodiment of the present invention, the system 10 includes at least one digital camera 34 and preferably two such cameras, mounted on the resident vehicle so as to pick up an image of a trailing vehicle and/or leading vehicle or the front and/or rear areas adjacent the resident vehicle. The microprocessor 12 controls the digital camera 34 to periodically store in the RAM 16 the digital images that are picked up in the RAM 16. Each image is stored in association with data from the profile sensors 20 and data representing the time of occurrence of the sampled data and image. The image may also be stored in association with the distance data from the range finder 22 sampled at the same time. As discussed above, upon the occurrence of one of a number of events, the image, profile and distance data are transferred from the RAM 16 to the non-volatile memory 18 or are secured in a single memory so that the data is not written over to provide a permanent record thereof. The permanent data record provided by the system 10 allows the circumstances of an accident to be analyzed to provide an indication of the cause of the accident. The data recorder and warning lights provided by the indicators 24 and/or 26 provide a strong deterrent to unsafe driving not only for the driver of a resident vehicle but for the driver of a trailing vehicle as well.

Figure 3A:
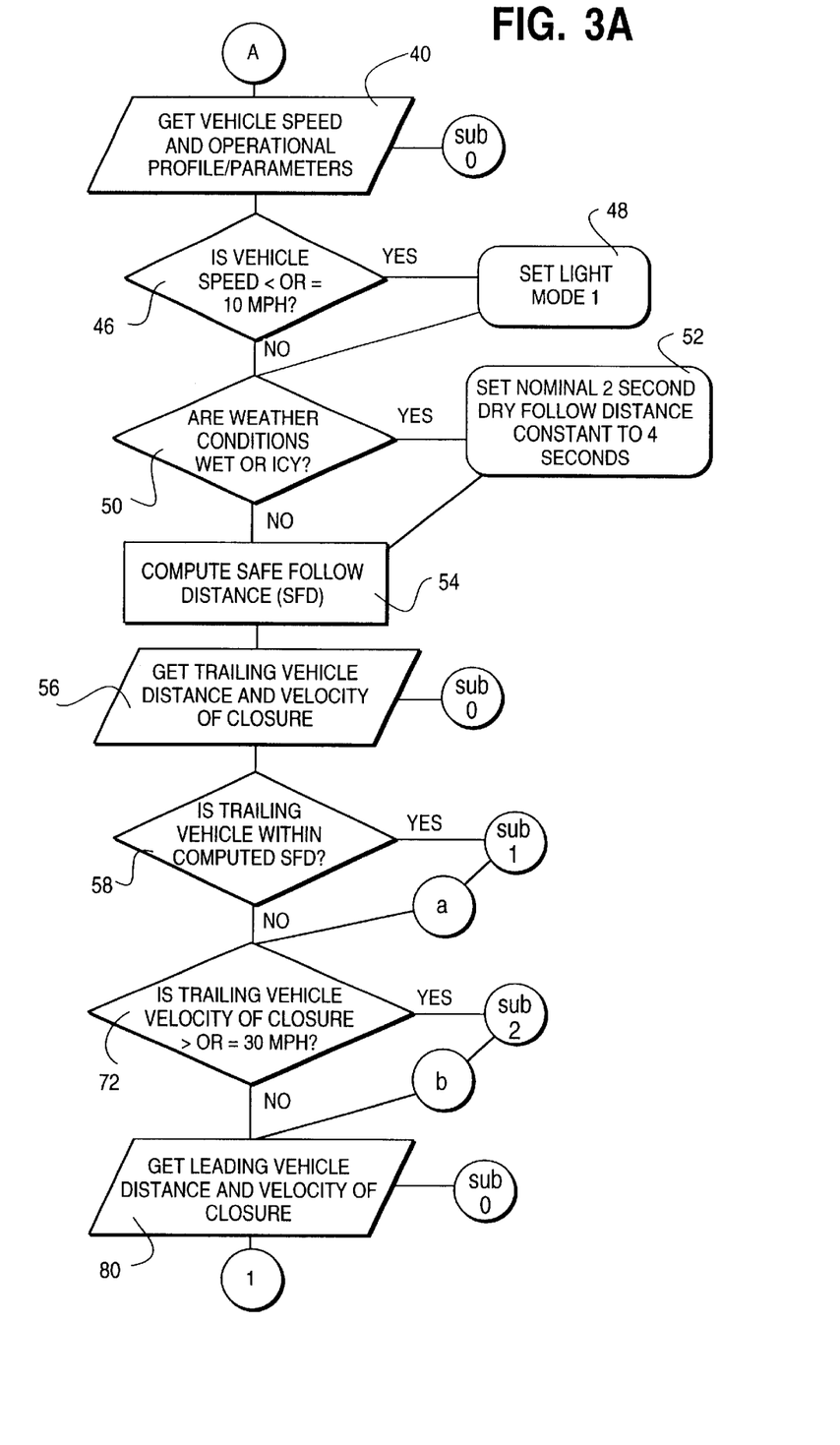
FIG. 3 is a flow chart illustrating a main software routine for the system of FIG. 1.
Figure 3B:
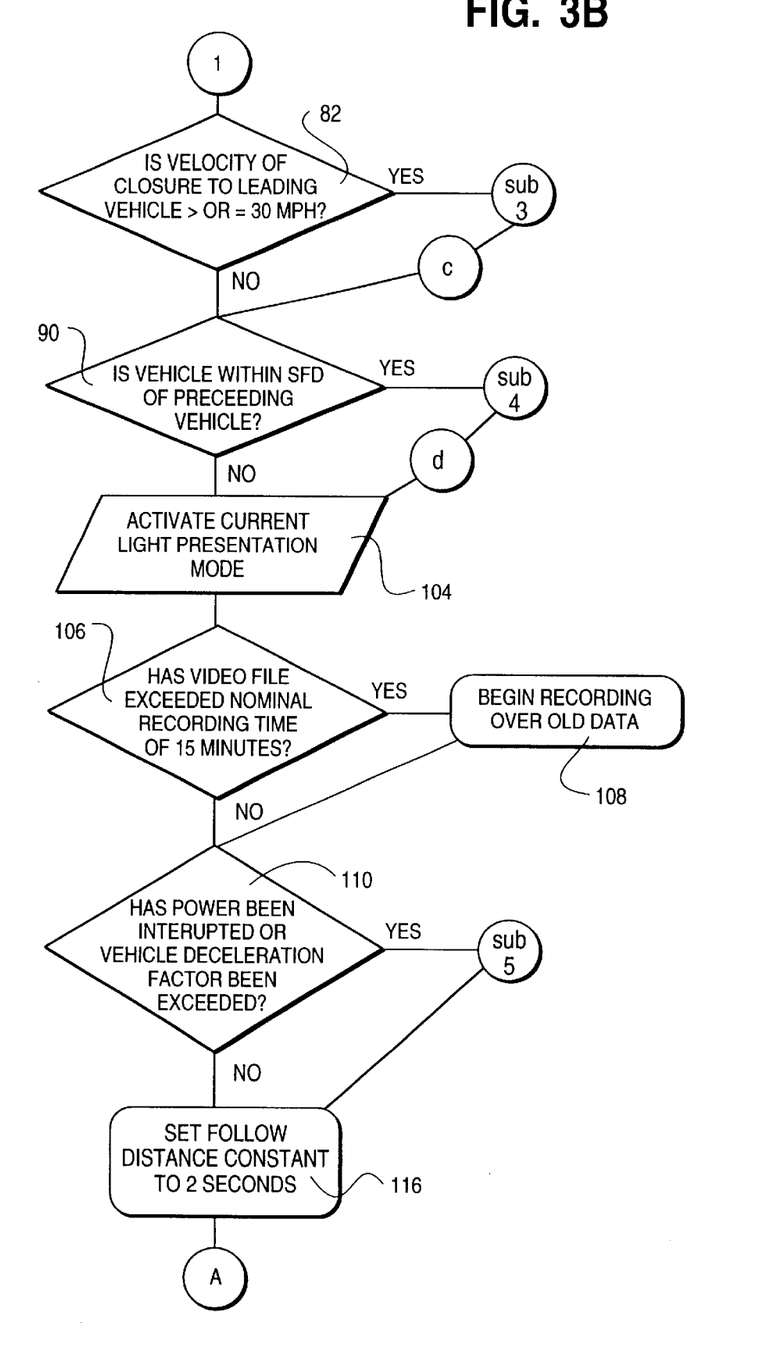
Figures 4, 6:
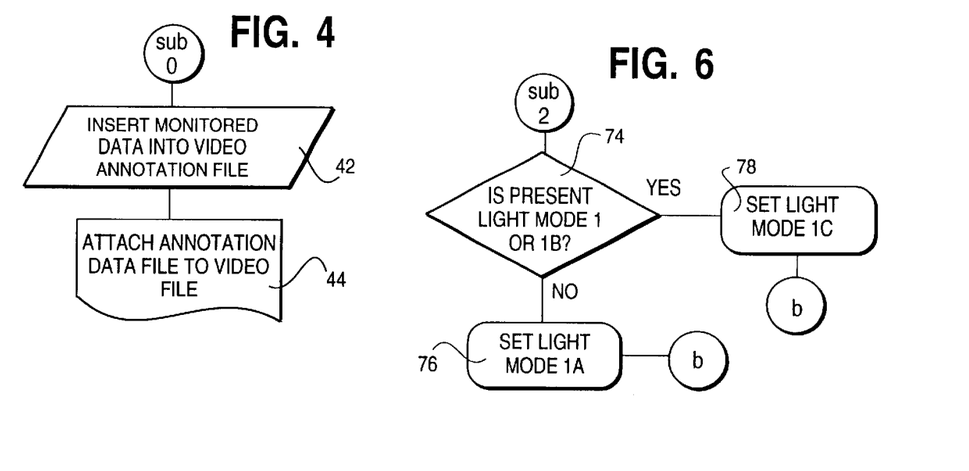
FIG. 4 is a flow chart illustrating a subroutine for sampling the data and storing it in an annotated file with time of occurrence information.
FIG. 6 is a flow chart illustrating a subroutine for setting the light pattern of the indicator in response to the velocity of closure of the trailing vehicle on a resident vehicle.
Figures 10A, 10B, 11B:
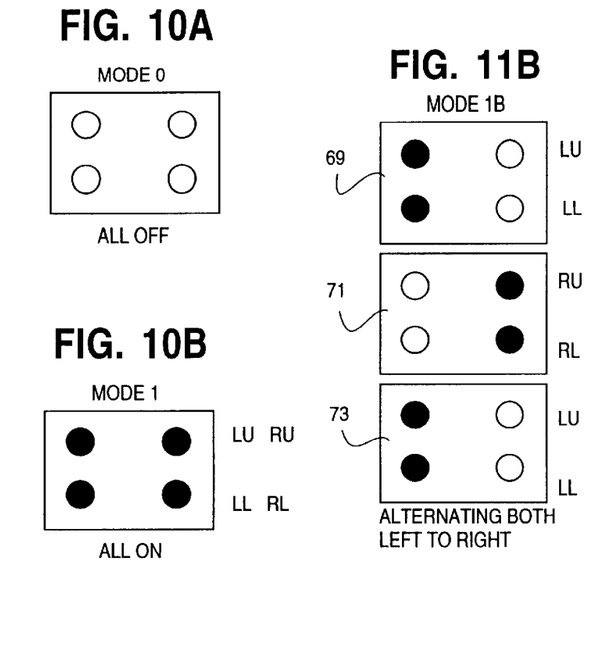
FIGS. 10A and 10B are diagrams respectively illustrating the light pattern of the indicator when the system is off and when the speed of the resident vehicle is 10 mph or less.
FIGS. 11A, 11B and 11C illustrate the highest priority light patterns of the indicator which are displayed when at least one vehicle is closing on an adjacent vehicle too fast.

The microprocessor 12 operates in accordance with the flow chart depicted in FIG. 3 to monitor and record the data and to control the TADDLE lights 24 and/or driver display 26. At block 40, the microprocessor 12 gets the vehicle speed data and operational profile parameter data from the sensors 20 and implements subroutine 0 depicted in FIG. 4. As shown in FIG. 4, the microprocessor 12 at block 42 annotates the digital image picked up by the camera 34 with the data obtained from the sensors 20 and the time of occurrence of the data. At block 44, the microprocessor stores the annotated digital information in the memory 16. Thereafter, the microprocessor 12 returns to block 46 of FIG. 3 to determine whether the speed of the resident vehicle is less than or equal to 10 mph. If the resident vehicle's speed is less than or equal to 10 mph, the microprocessor 12 proceeds to block 48 to set the light indicators 24 and/or 26 to a mode 1 pattern as illustrated in FIG. 10B. In mode 1, the four lights 28–31 are all turned on and remain on constantly. It is noted that when the resident vehicle is turned off, the light pattern is such as depicted in FIG. 10A wherein all of the lights 28–31 are off.

From blocks 46 or 48, the microprocessor 12 proceeds to block 50 to determine whether the weather conditions are wet or icy. The weather conditions can be determined by the user entering the information by a keypad or switch. Alternatively, the system can automatically determine that the weather conditions are wet if the windshield wipers are on or via a sensor that detects water and/or ice. If the weather conditions are determined to be wet or icy, the microprocessor 12 proceeds to block 52 to reset the nominal or default safe following distance constant of two seconds to four seconds. From blocks 50 or 52, the microprocessor 12 proceeds to block 54 to compute the safe following distance. The safe following distance is determined based on the speed of the resident vehicle and a two second safe following distance constant for dry conditions or a four second safe following distance constant for wet conditions. In particular, for dry conditions, the safe follow distance is the distance between the resident vehicle and a trailing vehicle wherein two seconds have elapsed before the trailing vehicle has reached the same point that the leading vehicle has just passed. Under wet or icy conditions, a four second time interval is utilized to compute the safe following distance. From block 54, the microprocessor 12 proceeds to block 56.

At block 56, the microprocessor 12 samples the trailing vehicle distance from the range finder 22 and based on a number of trailing vehicle distance values the microprocessor 12 computes a velocity of closure value. The velocity of closure value is the speed at which the trailing vehicle is closing on or approaching the resident vehicle. At block 56, the microprocessor 12 also implements subroutine 0 depicted in FIG. 4 to update the annotated data file with the trailing vehicle distance and velocity of closure data.

Thereafter, the microprocessor 12 controls the light indicators 24 and/or 26 to provide a light pattern corresponding to a particular message or warning in accordance with the trailing vehicle distance and the trailing vehicle velocity of closure.

Figures 5, 7:
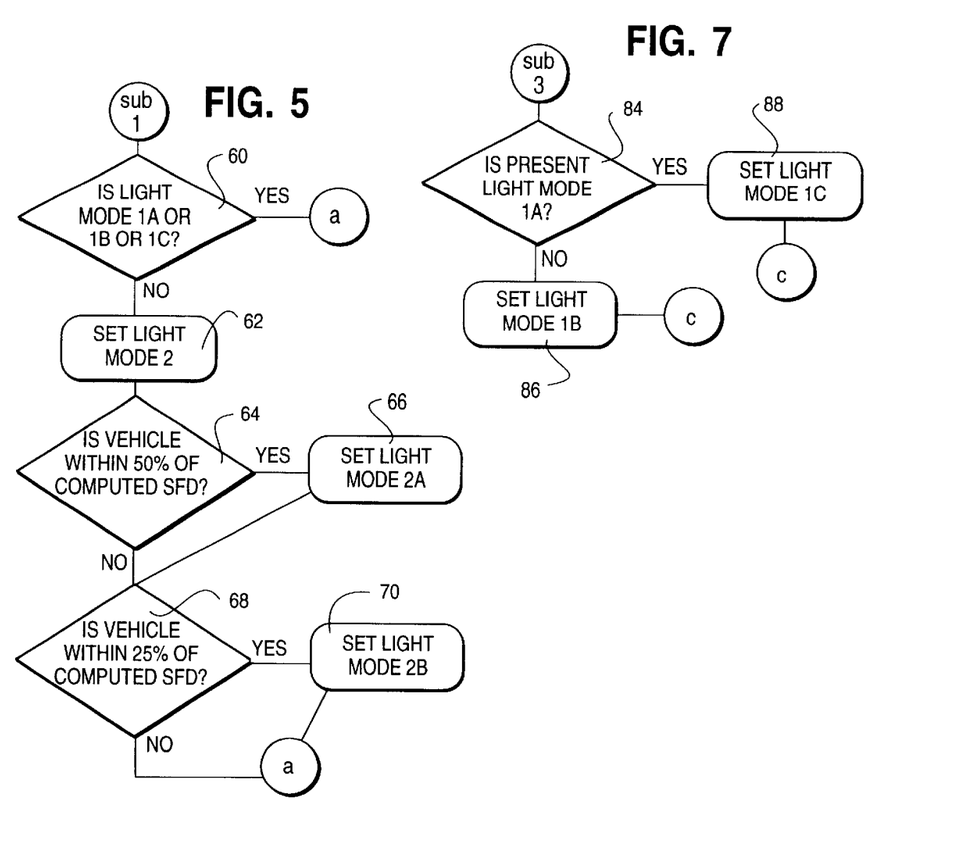
FIG. 5 is a flow chart illustrating a subroutine for setting the light pattern of the indicator in response to the trailing vehicle distance.
FIG. 7 is a flow chart illustrating a subroutine for setting the light pattern of the indicator in response to the velocity of closure of the resident vehicle on a leading vehicle.
Figure 11A:
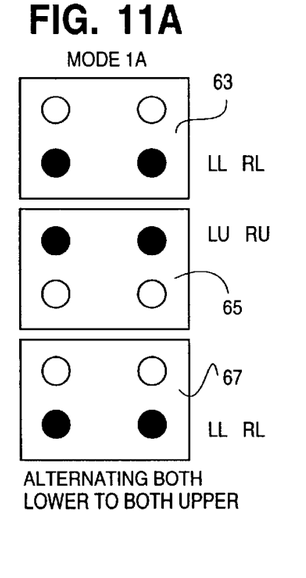
Figure 11C:
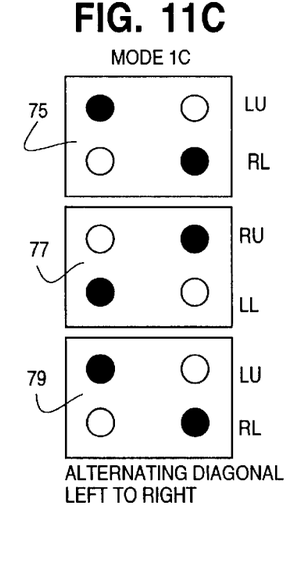

More particularly, the microprocessor 12 at block 58 determines whether the trailing vehicle distance is less than or equal to the safe following distance computed at block 54. If the trailing vehicle distance is less than or equal to the computed safe following distance, the microprocessor 12 proceeds to subroutine 1 as depicted in FIG. 5. As shown in FIG. 5, the microprocessor 12 at block 60 determines whether the current light pattern is a mode 1A light pattern, a mode 1B light pattern or a mode 1C light pattern. A mode 1A light pattern is depicted in FIG. 11A and comprises a light pattern wherein first the left lower and right lower lights 29 and 31 are simultaneously flashed as illustrated at block 63. Next, the left upper and right upper lights 28 and 30 are simultaneously flashed as depicted at block 65. Thereafter, the left lower and right lower lights 29 and 31 are again flashed. The alternate flashing of the lower two lights 29 and 31, then the upper two lights 28 and 30 continues during mode 1A to indicate that a trailing vehicle is closing on or approaching the resident vehicle at a speed of 30 mph or greater. The mode 1B light pattern is depicted in FIG. 11B. In mode 1B, the left upper and left lower lights 28 and 29 are simultaneously flashed as shown at block 69. Thereafter, the right upper and right lower lights 30 and 31 are flashed as shown at block 71, followed by the flashing of the left upper and left lower lights 28 and 29 again as depicted at block 73. The alternate flashing of the left lights followed by the right lights is continued to provide the mode 1B light pattern which is indicative of the resident vehicle closing on or approaching a leading vehicle at a speed of 30 mph or greater. The mode 1C light pattern is depicted in FIG. 11C wherein the light pattern is such that the left upper and right lower lights 28 and 31 are simultaneously flashed, followed by the simultaneous flashing of the left lower and right upper lights 29 and 30 which is in turn followed by the flashing of the left upper and right lower lights 28 and 31 as depicted in respective blocks 75, 77 and 79. The alternate flashing of diagonal lights in the mode 1C light pattern is indicative of one of two situations. The first situation is wherein the trailing vehicle is closing on the resident vehicle at 30 mph or greater and the resident vehicle is closing on a leading vehicle at 30 mph or greater. The second situation is wherein the trailing vehicle is closing on the resident vehicle at 30 mph or greater and the speed of the resident vehicle is 10 mph or less. The modes 1A, 1B and 1C are the highest priority light patterns and as discussed above are based on the velocity of closure of one or two vehicles. If the microprocessor 12 determines at block 60 that the light pattern is currently set to one of these high priority modes, the microprocessor does not reset the mode to a lower priority mode but returns to the main flow chart shown in FIG. 3 at block 72.

Figure 12A:
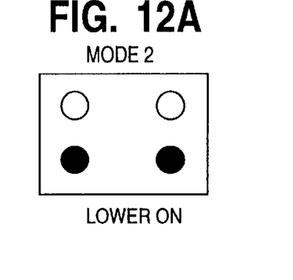
FIGS. 12A, 12B and 12C illustrate various light patterns of the indicator when a trailing vehicle is tail-gating the resident vehicle.
Figure 12B:
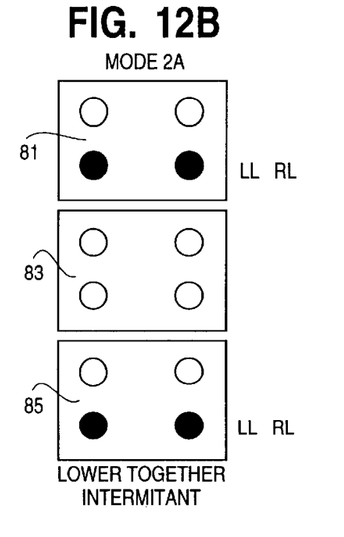
Figure 12C:
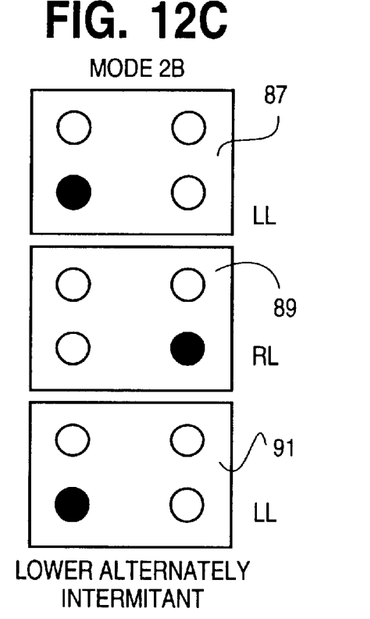

The microprocessor 12 as shown in FIG. 5 sets the light mode at block 62 to mode 2 as depicted in 12A if the current light mode is not in the highest priority modes of 1A, 1B or 1C but the trailing vehicle distance is less than the safe following distance computed at block 54. As shown in FIG. 12A, the mode 2 light pattern is such that the left lower and right lower lights 29 and 31 remain continuously on. From block 62, the microprocessor 12 proceeds to block 64 to determine whether the trailing vehicle distance is less than 50% of the safe follow distance but greater than 25% of the safe follow distance. If so, the microprocessor 12 proceeds from block 64 to block 66 to set the light pattern to mode 2A as depicted in FIG. 12B. The mode 2A light pattern is such that first the left lower and right lower lights 29 and 31 are flashed as illustrated at block 81, followed by the turning off of all of the lights 28–31 at block 83 and thereafter again flashing the left lower and right lower lights 29 and 31 as shown at block 85. From blocks 64 and 66, the microprocessor 12 proceeds to block 68 to determine whether the trailing vehicle distance is less than 25% of the computed safe follow distance. If so, the microprocessor 12 sets the light pattern to mode 2B at block 70. The light pattern of mode 2B is illustrated in FIG. 12C. In mode 2B, first the lower left light 29 is flashed as illustrated at block 87, followed by the flashing of the right lower light 31 as illustrated at block 89 and again followed by the flashing of the left lower light 29 at block 91. This sequence of lights continues in mode 2B to indicate that the trailing vehicle distance is less than 25% of the safe follow distance. From blocks 68 and 70 the computer 12 returns to block 72.

The microprocessor 12 at block 72 determines whether the trailing vehicle's velocity of closure as determined at block 56 is greater than or equal to 30 mph. If so, the microprocessor proceeds to implement subroutine 2 as depicted in FIG. 6. As shown in FIG. 6, the microprocessor 12 at block 74 determines whether the current mode is mode 1 wherein the speed of the resident vehicle is less than or equal to 10 mph or whether the current mode is mode 1B indicative of the resident vehicle closing on a leading vehicle at 30 mph or greater. If the present mode is 1 or 1B, the microprocessor 12 proceeds from block 74 to block 78 to set the light pattern to mode 1C as depicted in FIG. 11C, discussed above. If the microprocessor 12 determines at block 74 that the current mode is neither mode 1 or mode 1B the microprocessor 12 proceeds to block 76. At block 76, the microprocessor 12 sets the light pattern to mode 1A to indicate that the trailing vehicle is closing on the resident vehicle at 30 mph or greater.

Next, the microprocessor 12 at block 80 gets the leading vehicle distance i.e. the distance between the resident vehicle and the leading vehicle from a range finder 22 and determines the velocity of closure of the resident vehicle on the leading vehicle. From block 80, the microprocessor proceeds to block 82 to determine whether the velocity of closure of the resident vehicle with respect to the leading vehicle is greater than or equal to 30 mph. If so, the microprocessor 12 implements subroutine 3 as depicted in FIG. 7. As shown in FIG. 7, the microprocessor 12 at block 84 determines whether the current light indication mode is mode 1A indicating that the trailing vehicle is closing on the resident vehicle at a speed of 30 mph or greater. If so, the microprocessor 12 proceeds to block 88 to set the mode to mode 1C as depicted in FIG. 11C to indicate that the trailing vehicle is closing on the resident vehicle at 30 mph or greater and that the resident vehicle is closing on the leading vehicle at 30 mph. If, the current mode is not mode 1A, the microprocessor 12 proceeds from block 84 to block 86 to set the light indication mode to mode 1B as depicted in FIG. 1B to indicate that the resident vehicle is closing on the leading vehicle at 30 mph or greater. Thereafter, the microprocessor 12 returns to the main flow chart of FIG. 3 at block 90.

Figure 8:
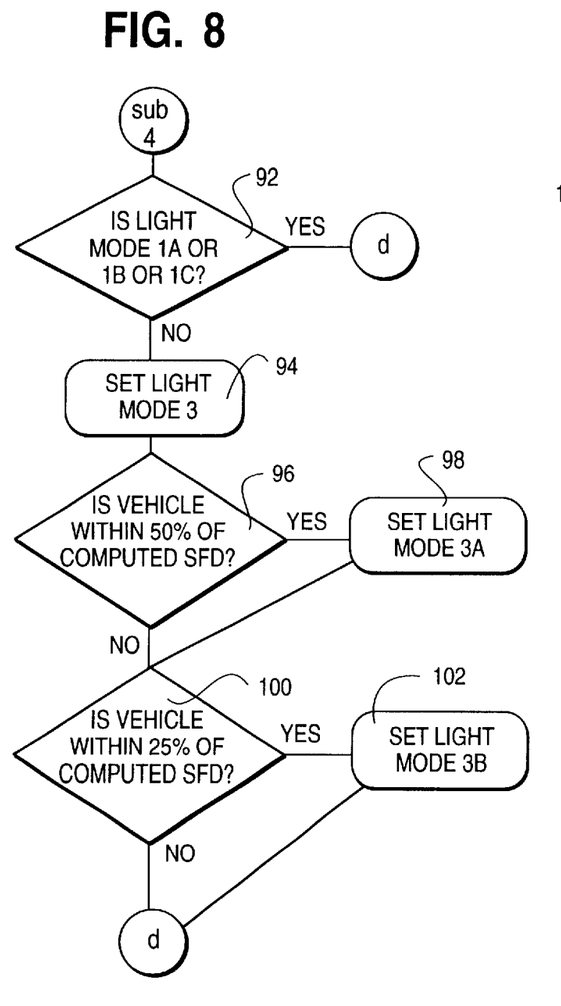
FIG. 8 is a flow chart illustrating a subroutine for setting the light pattern of the indicator in response to the leading vehicle distance.
Figure 13A:
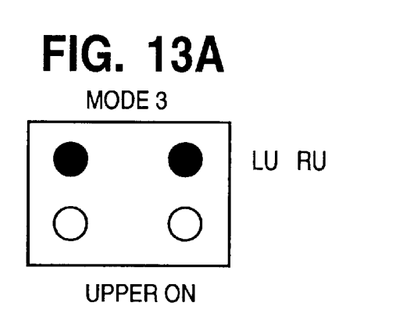
FIGS. 13A, 13B and 13C illustrate various light patterns of the indicator when a resident vehicle is tail-gating a leading vehicle.
Figure 13B:
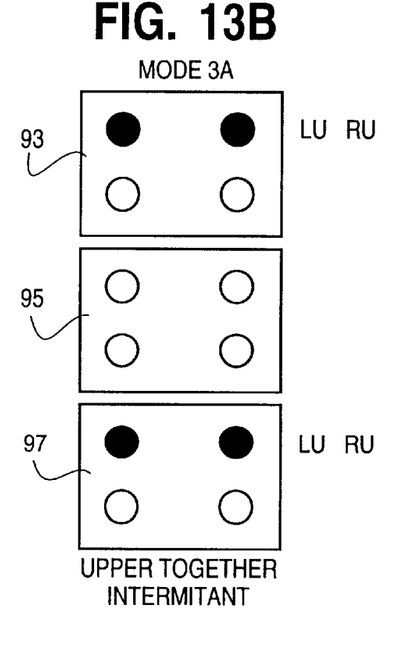
Figure 13C:
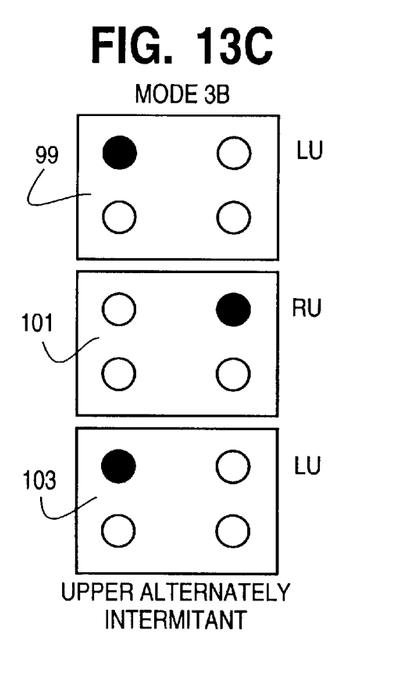

The microprocessor 12 at block 90 determines whether the resident vehicle's distance is less than the safe follow distance determined at block 54 but is greater than 50% of the safe follow distance. If so, the microprocessor 12 proceeds to implement the subroutine 4 depicted in FIG. 8. As shown in FIG. 8, the microprocessor 12 at block 92 determines whether the current light mode is mode 1A, 1B or 1C and if so, the microprocessor 12 does not change the light indication mode but returns to the main flow chart at 104. If the current light mode is not mode 1A, 1B or 1C, the microprocessor proceeds from block 92 to block 94 to set the light mode to mode 3. As shown in FIG. 13, in mode 3, the left upper and right upper lights 28 and 30 are continuously on to indicate that the resident vehicle distance is less than the safe follow distance but greater than 50% of the safe follow distance. If the microprocessor 12 determines at block 96 that the resident vehicle's distance from the leading vehicle is less than 50% of the safe follow distance but greater than 25% of the safe follow distance, the microprocessor sets the light indication mode to mode 3A. Mode 3A is depicted in FIG. 13B. In mode 3A, the light pattern sequence is such that first the left upper and right upper lights 28 and 30 are flashed as illustrated at block 93, followed by turning off all of the lights 28–31 as illustrated at block 95 and thereafter, again flashing the left upper and right upper lights 28 and 30 as illustrated at block 97. If the microprocessor 12 determines at block 100 that the resident vehicle's distance from the leading vehicle is less than 25% of the computed safe follow distance, the microprocessor 12 proceeds from block 100 to block 102 to set the light indication mode to mode 3B shown in FIG. 13C. The light indication mode of mode 3B is such that first the left upper light 28 is flashed as illustrated at block 99 followed by the flashing of only the right upper light 30 as illustrated at block 101 which is followed by the flashing of the left upper light 28 again as illustrated at block 103. This light pattern sequence continues throughout mode 3B.

Figure 9:
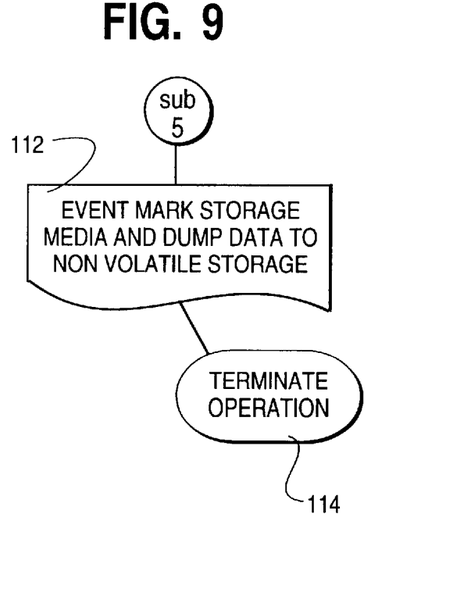
FIG. 9 is a flow chart illustrating a subroutine for making a historical record and storing the marked record in a non-volatile memory.

After setting the light indication mode in accordance with subroutine 4 of FIG. 8, the microprocessor 12 returns to the main program depicted in FIG. 3 at block 104. At block 104, the microprocessor 12 activates the currently set light pattern so as to control the TADDLE lights 24 and/or driver display 26 to provide the set light pattern. Thereafter, at block 106 the microprocessor 12 determines whether the history profile record stored in the RAM 106 has exceeded a predetermined amount of data corresponding to a nominal recording time of 15 minutes. If so, the microprocessor 12 at block 108 begins recording over the oldest data in the history record portion of the RAM 16 at block 108. At block 110, the microprocessor 12 determines whether one of a number of events have occurred to cause the history profile record to be transferred from the RAM 16 to the non-volatile memory 18. One event detected at block 110 is the actuation of an event mark switch 120. The event mark switch 120 is a manually actuable switch that the driver can actuate to mark a particular 15 minute historic record in the RAM 16 and to cause the microprocessor 12 to transfer the marked record to the non-volatile memory as discussed below. Another event detected at block 110 is the interruption of power from a main power supply 122. This may happen in an accident or if someone tries to tamper with the monitoring system 10. If power has been interrupted, the microprocessor 12 proceeds to subroutine 5 depicted in FIG. 9. As shown in FIG. 9, the microprocessor 12 at block 112 causes an event marker to be associated with the historic record data stored in the RAM 16 and thereafter transfers the data to the non-volatile memory 18 and ceases operation at block 114. It is noted that depending upon the size of the non-volatile memory 18, more than one historic record associated with 15 minutes of data can be stored therein. In such a case, the microprocessor 12 will not terminate the operation of the system at block 114 until the non-volatile memory 18 is full. Another event that will cause the marking of a historic record in RAM 16 with an event marker and the transfer of the data to the non-volatile memory 18 is a deceleration of the resident vehicle at a rate greater than a predetermined value and/or the actuation of the vehicle's air bag. An abrupt deceleration and/or actuation of the air bag is indicative of slamming on the brakes and/or the occurrence of an accident. If none of the predetermined events is detected at block 110, the microprocessor 12 proceeds to block 116 to reset the safe follow distance constant to two seconds. Thereafter, the microprocessor 12 returns to block 40.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A system for use in a resident vehicle for monitoring the resident vehicle in relation to an adjacent vehicle, the resident vehicle having a plurality of operating parameters under a driver's control including speed of the vehicle, the system comprising:
   a range finder mounted on the resident vehicle to determine a distance from a trailing vehicle;
   a controller responsive to the speed of the resident vehicle to determine a safe following distance, the controller comparing the trailing vehicle distance to the safe following distance to determine whether the trailing vehicle is at a distance from the resident vehicle that is less than the determined safe following distance; and
   an indicator mounted on the resident vehicle and viewable by the trailing vehicle, the indicator being responsive to the controller to warn the trailing vehicle that it is following the resident vehicle too closely.

2. A monitoring system for use in a resident vehicle as recited in claim 1 wherein said indicator includes a plurality of lights and the controller controls the lights to provide different light presentations to indicate various levels of warnings in response to distance data from the range finder.

3. A monitoring system for use in a resident vehicle as recited in claim 1 wherein the controller samples the trailing vehicle distance over time and is responsive to a plurality of the sampled distance values to determine how fast the trailing vehicle is approaching the resident vehicle, the controller comparing how fast the trailing vehicle is approaching to a predetermined value and the controller controlling the indicator to provide an indication that the trailing vehicle is approaching too fast if the predetermined value is met or exceeded.

4. A monitoring system for use in a resident vehicle as recited in claim 1 wherein the indicator is a plurality of lights controlled by the controller to provide different light patterns depending upon how close the trailing vehicle is to the resident vehicle.

5. A monitoring system for use in a resident vehicle as recited in claim 1 including a memory for storing data and wherein the controller stores in the memory data representing a plurality of operating parameters of the resident vehicle and data representing the distance of a trailing vehicle in association with data representing the time of occurrence of the data to provide a record thereof.

6. A monitoring system for use in a resident vehicle as recited in claim 5 wherein the memory stores a predetermined amount of data, the oldest stored data being replaced with new data as new data exceeding the predetermined amount of data is received.

7. A monitoring system for use in a resident vehicle as recited in claim 5 wherein the memory is a non-volatile data storage device.

8. A monitoring system for use in a resident vehicle as recited in claim 5 wherein the memory includes a temporary memory that stores a predetermined amount of data, the stored oldest data being replaced with new data as new data exceeding the predetermined amount of data is received and a permanent memory that stores a predetermined amount of data.

9. A monitoring system for use in a resident vehicle as recited in claim 8 wherein the controller transfers data from the temporary memory to the permanent memory upon the occurrence of at least one predetermined event.

10. A monitoring system for use in a resident vehicle as recited in claim 9 including a manually actuable switch wherein one event to which the controller responds to transfer the data to the permanent memory is the manual actuation of the switch.

11. A monitoring system for use in a resident vehicle as recited in claim 9 wherein the controller monitors the deceleration of the resident vehicle and transfers the data to the permanent memory if the resident vehicle's deceleration is greater than or equal to a predetermined value.

12. A monitoring system for use in a resident vehicle as recited in claim 9 wherein the system is coupled to a power supply and the controller transfers data to the permanent memory if power from the power supply to the system is interrupted.

13. A monitoring system for use in a resident vehicle as recited in claim 5 including at least one camera mounted on the resident vehicle in a position to pick up an image of an adjacent vehicle and the controller storing in the memory an image picked up by the camera in association with data representing the time of occurrence of the image.

14. A system for use in a resident vehicle for monitoring the resident vehicle in relation to an adjacent vehicle, the resident vehicle having a plurality of operating parameters under a driver's control including speed of the vehicle, the system comprising:
   a range finder mounted on the resident vehicle to determine a distance from a leading vehicle;
   a controller responsive to the speed of the resident vehicle to determine a safe following distance, the controller comparing the leading vehicle distance to the safe following distance to determine whether the resident vehicle is at a distance from the leading vehicle that is less than the determined safe following distance;
   a first visual indicator mounted on the resident vehicle in a position viewable by the driver of the resident vehicle and responsive to the controller to provide a visual warning that the resident vehicle is following the leading vehicle too closely; and
   a second visual indicator mounted on the resident vehicle in a position viewable by the driver of a trailing vehicle to provide a visual warning that the resident vehicle is following the leading vehicle too closely.

15. A monitoring system for use in a resident vehicle as recited in claim 14 including a range finder mounted on the resident vehicle to determine a distance from the trailing vehicle, the controller comparing the trailing vehicle distance to the safe following distance to determine whether the trailing vehicle distance is less than the safe following distance and the controller controlling the first and/or second indicator to provide a warning that a trailing vehicle is following the resident vehicle too closely if the trailing vehicle distance is less than the safe following distance.

16. A monitoring system for use in a resident vehicle as recited in claim 15 wherein the indicator includes a plurality of lights controlled by the controller to provide one light pattern to warn that the trailing vehicle is following the resident vehicle too closely and a different light pattern if the resident vehicle is following a leading vehicle too closely.

17. A system for use in a resident vehicle for monitoring the resident vehicle in relation to an adjacent vehicle, the resident vehicle having a plurality of operating parameters under a driver's control including speed of the vehicle, the system comprising:

a range finder mounted on the resident vehicle to determine a distance from a leading vehicle;

a controller responsive to the speed of the resident vehicle to determine a safe following distance, the controller comparing the leading vehicle distance to the safe following distance to determine whether the resident vehicle is at a distance from the leading vehicle that is less than the determined safe following distance; and an indicator mounted on the resident vehicle and responsive to the controller to provide a warning that the resident vehicle is following the leading vehicle too closely wherein the controller samples the leading vehicle distance over time and is responsive to a plurality of the sampled distance values to determine how fast the resident vehicle is approaching a leading vehicle, the controller comparing how fast the resident vehicle is approaching a leading vehicle to a predetermined value and the controller controlling the indicator to provide an indication that the resident vehicle is approaching too fast if the predetermined value is met or exceeded.

18. A system for use in a resident vehicle for monitoring the resident vehicle in relation to an adjacent vehicle, the resident vehicle having a plurality of operating parameters under a driver's control including speed of the vehicle, the system comprising:

a range finder mounted on the resident vehicle to determine a distance from a leading vehicle;

a memory for storing data;

a controller responsive to the speed of the resident vehicle to determine a safe following distance, the controller comparing the leading vehicle distance to the safe following distance to determine whether the resident vehicle is at a distance from the leading vehicle that is less than the determined safe following distance and the controller storing in the memory data representing a plurality of operating parameters of the resident vehicle including data representing the leading vehicle distance in association with data representing the time of occurrence of the data to provide a record thereof; and an indicator mounted on the resident vehicle and responsive to the controller to provide a warning that the resident vehicle is following the leading vehicle too closely.

19. A monitoring system for use in a resident vehicle as recited in claim 18 wherein the memory stores a predetermined amount of data, the oldest stored data being replaced with new data as new data exceeding the predetermined amount of data is received.

20. A monitoring system for use in a resident vehicle as recited in claim 18 wherein the memory is a non-volatile data storage device.

21. A monitoring system for use in a resident vehicle as recited in claim 18 wherein the memory includes a temporary memory that stores a predetermined amount of data, the stored oldest data being replaced with new data as new data exceeding the predetermined amount of data is received and a permanent memory that stores a predetermined amount of data.

22. A monitoring system for use in a resident vehicle as recited in claim 21 wherein the controller transfers data from the temporary memory to the permanent memory upon the occurrence of at least one predetermined event.

23. A monitoring system for use in a resident vehicle as recited in claim 22 including a manually actuable switch wherein one event to which the controller responds to transfer the data to the permanent memory is the manual actuation of the switch.

24. A monitoring system for use in a resident vehicle as recited in claim 22 wherein the controller monitors the deceleration of the resident vehicle and transfers the data to the permanent memory if the resident vehicle's deceleration is greater than or equal to a predetermined value.

25. A monitoring system for use in a resident vehicle as recited in claim 22 wherein the system is coupled to a power supply and the controller transfers data to the permanent memory if power from the power supply to the system is interrupted.

26. A monitoring system for use in a resident vehicle as recited in claim 18 including at least one camera mounted on the resident vehicle in a position to pick up an image of an adjacent vehicle and the controller storing in the memory an image picked up by the camera in association with data representing the time of occurrence of the image.

27. A vehicle operating data recorder for use in a resident vehicle having a plurality of operating parameters under a driver's control including speed of the vehicle, the data recorder comprising:

a range finder mounted on the resident vehicle to determine a distance from an adjacent vehicle;

a memory; and a controller sampling each of a plurality of the operating parameters of the resident vehicle and the adjacent vehicle distance over time, the controller storing in the memory data representing the sampled plurality of operating parameters of the resident vehicle and the adjacent vehicle distance in association with data representing the time of occurrence of the sampled data to provide a record thereof.

28. A vehicle operating data recorder as recited in claim 27 wherein the memory stores a predetermined amount of data, the oldest stored data being replaced with new data as new data exceeding the predetermined amount of data is received.

29. A vehicle operating data recorder as recited in claim 27 wherein the memory is a non-volatile memory.

30. A vehicle operating data recorder as recited in claim 27 wherein the memory includes a temporary memory that stores a predetermined amount of data, the stored oldest data being replaced with new data as new data exceeding the predetermined amount of data is received and a permanent memory that stores a predetermined amount of data.

31. A vehicle operating data recorder as recited in claim 30 wherein the controller transfers data from the temporary memory to the permanent memory upon the occurrence of at least one predetermined event.

32. A vehicle operating data recorder as recited in claim 31 including a manually actuable switch wherein one event to which the controller responds to transfer the data to the permanent memory is the manual actuation of the switch.

33. A vehicle operating data recorder as recited in claim 31 wherein the controller monitors the deceleration of the resident vehicle and transfers the data to the permanent memory if the resident vehicle's deceleration is greater than or equal to a predetermined value.

34. A vehicle operating data recorder as recited in claim 31 wherein the data recorder is coupled to a power supply and the controller transfers data to the permanent memory if power from the power supply to the data recorder is interrupted.

35. A vehicle operating data recorder as recited in claim 27 including at least one camera mounted on the resident vehicle in a position to pick up an image of an adjacent vehicle and the controller storing in the memory an image picked up by the camera in association with data representing the time of occurrence of the image.

36. A vehicle operating data recorder as recited in claim 27 including an indicator mounted on the resident vehicle and controlled by the controller to provide a warning if the adjacent vehicle distance is less than a determined value.

37. A vehicle operating data recorder as recited in claim 36 wherein the indicator is viewable by an adjacent vehicle.

38. A vehicle operating data recorder for use in a resident vehicle having a plurality of operating parameters under a driver's control, comprising:

at least one camera mounted on the resident vehicle in a position to pick up an image of an adjacent vehicle;

a memory; and a controller periodically sampling each of a plurality of the operating parameters of the resident vehicle, the controller storing in the memory an image picked up by the camera in association with a plurality of the sampled operating parameters and in association with data representing the time of occurrence of the picked up image and the sampled operating parameters.

39. A vehicle operating data recorder as recited in claim 38 wherein the memory stores a predetermined amount of data, the oldest stored data being replaced with new data as new data exceeding the predetermined amount of data is received.

40. A vehicle operating data recorder as recited in claim 38 wherein the memory is a non-volatile data storage device.

41. A vehicle operating data recorder as recited in claim 40 wherein the memory includes a temporary memory that stores a predetermined amount of data, the stored oldest data being replaced with new data as new data exceeding the predetermined amount of data is received and a permanent memory that stores a predetermined amount of data.

42. A vehicle operating data recorder as recited in claim 41 wherein the controller transfers data from the temporary memory to the permanent memory upon the occurrence of at least one predetermined event.

43. A vehicle operating data recorder as recited in claim 42 including a manually actuable switch wherein one event to which the controller responds to transfer the data to the permanent memory is the manual actuation of the switch.

44. A vehicle operating data recorder as recited in claim 42 wherein the controller monitors the deceleration of the resident vehicle and transfers the data to the permanent memory if the resident vehicle's deceleration is greater than or equal to a predetermined value.

45. A vehicle operating data recorder as recited in claim 42 wherein the data recorder is coupled to a power supply and wherein the controller transfers data to the permanent memory if power from the power supply to the recorder is interrupted.

* * * * *